United States Patent
Wuersch

(10) Patent No.: US 7,482,819 B2
(45) Date of Patent: Jan. 27, 2009

(54) POWER TOOL WITH MEASUREMENT OF A PENETRATION DEPTH OF A WORKING TOOL

(75) Inventor: Christoph Wuersch, Werdenberg (CH)

(73) Assignee: Hilti Aktiengesellschaft, Schaan (LI)

( * ) Notice: Subject to any disclaimer, the term of this patent is extended or adjusted under 35 U.S.C. 154(b) by 89 days.

(21) Appl. No.: 11/503,462

(22) Filed: Aug. 10, 2006

(65) Prior Publication Data

US 2007/0035311 A1  Feb. 15, 2007

(30) Foreign Application Priority Data

Aug. 11, 2005  (DE) .................. 10 2005 038 090

(51) Int. Cl.
  *G01R 27/26* (2006.01)
  *B23Q 5/00* (2006.01)
  *B23B 39/04* (2006.01)

(52) U.S. Cl. .................. 324/644; 173/6; 408/8

(58) Field of Classification Search .......... 324/644, 324/637, 635, 662, 699, 716; 173/2, 4, 6, 173/11, 20, 21; 408/6, 8, 10–14, 116; 702/166; 175/40, 45

See application file for complete search history.

(56) References Cited

U.S. PATENT DOCUMENTS

| | | | |
|---|---|---|---|
| 3,990,805 A | 11/1976 | Ducrohet | |
| 4,250,971 A * | 2/1981 | Reibetanz et al. | 173/21 |
| 4,613,812 A * | 9/1986 | Gelston, II | 324/642 |
| 4,739,276 A | 4/1988 | Graube | |
| 5,109,947 A * | 5/1992 | Rector, III | 181/106 |
| 5,293,048 A * | 3/1994 | Skunes et al. | 250/559.29 |
| 5,933,014 A * | 8/1999 | Hartrumpf et al. | 324/642 |
| 6,499,221 B1 * | 12/2002 | Kuhn et al. | 33/514 |
| 6,665,948 B1 * | 12/2003 | Kozin et al. | 33/833 |
| 6,681,869 B2 * | 1/2004 | Wursch et al. | 173/2 |
| 6,786,683 B2 * | 9/2004 | Schaer et al. | 408/16 |
| 2002/0129948 A1 | 9/2002 | Wursch et al. | |
| 2005/0024231 A1 * | 2/2005 | Fincher et al. | 340/854.4 |
| 2005/0261870 A1 * | 11/2005 | Cramer et al. | 702/166 |
| 2007/0229853 A1 * | 10/2007 | Cheng | 356/625 |

FOREIGN PATENT DOCUMENTS

DE  2838968  6/1984
DE  3615874  6/1984

OTHER PUBLICATIONS

Search Report.

* cited by examiner

*Primary Examiner*—Vincent Q Nguyen
*Assistant Examiner*—Hoai-An D Nguyen
(74) *Attorney, Agent, or Firm*—Abelman, Frayne & Schwab

(57) ABSTRACT

A power tool (1) for driving a working tool (3) that penetrates at least axially into a to-be-machined material (2), and including a signal processor (6, 6'), and a transducer (5) which is suitable for exciting and detecting a high-frequency electromagnetic wave (4) propagating axially along the working tool (3) and which is connected to the signal processor (6, 6') that is designed to determine the penetration depth (T) of the working tool (3) into the material (2) based on high-frequency electromagnetic waves (4).

16 Claims, 2 Drawing Sheets

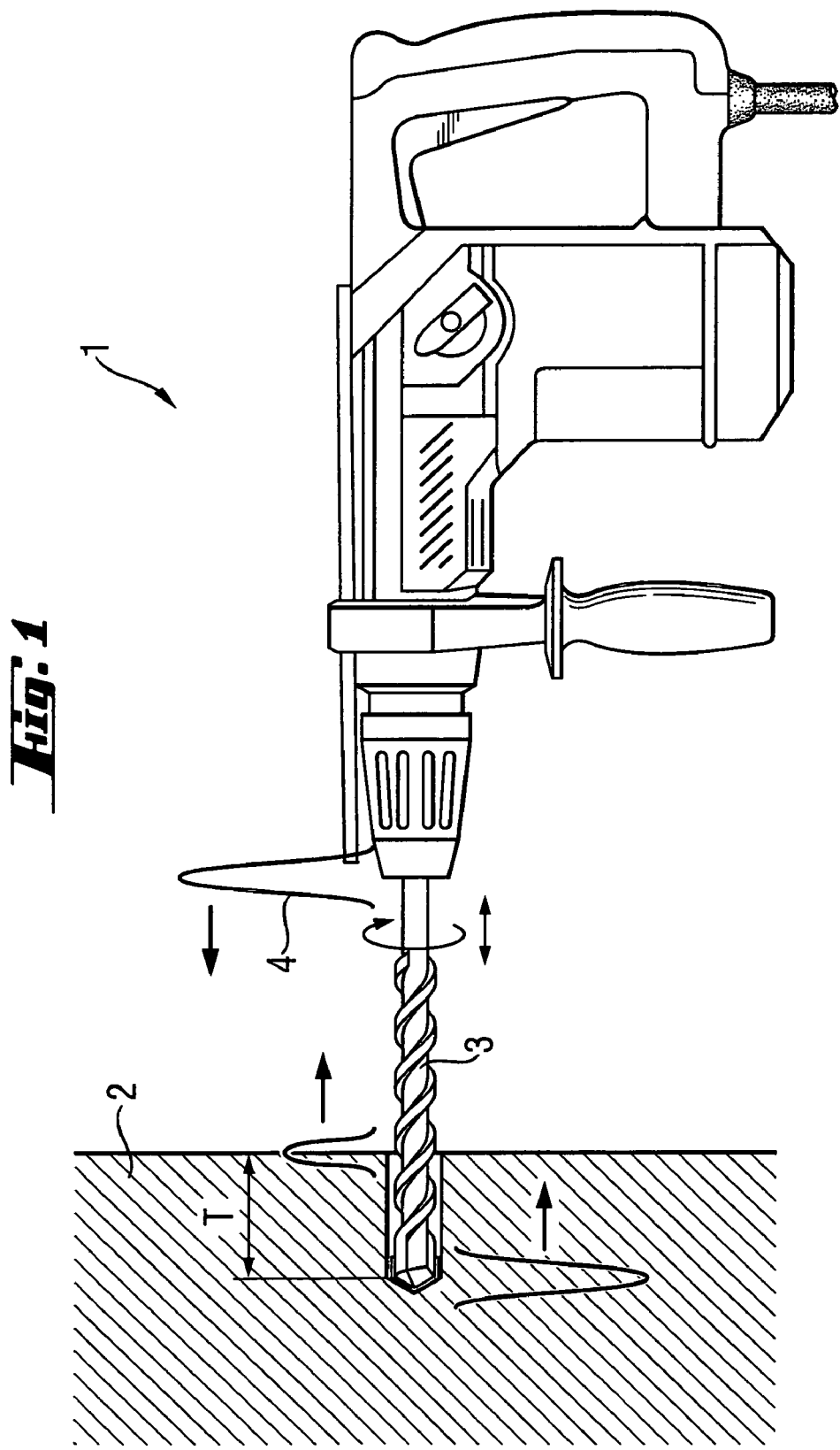

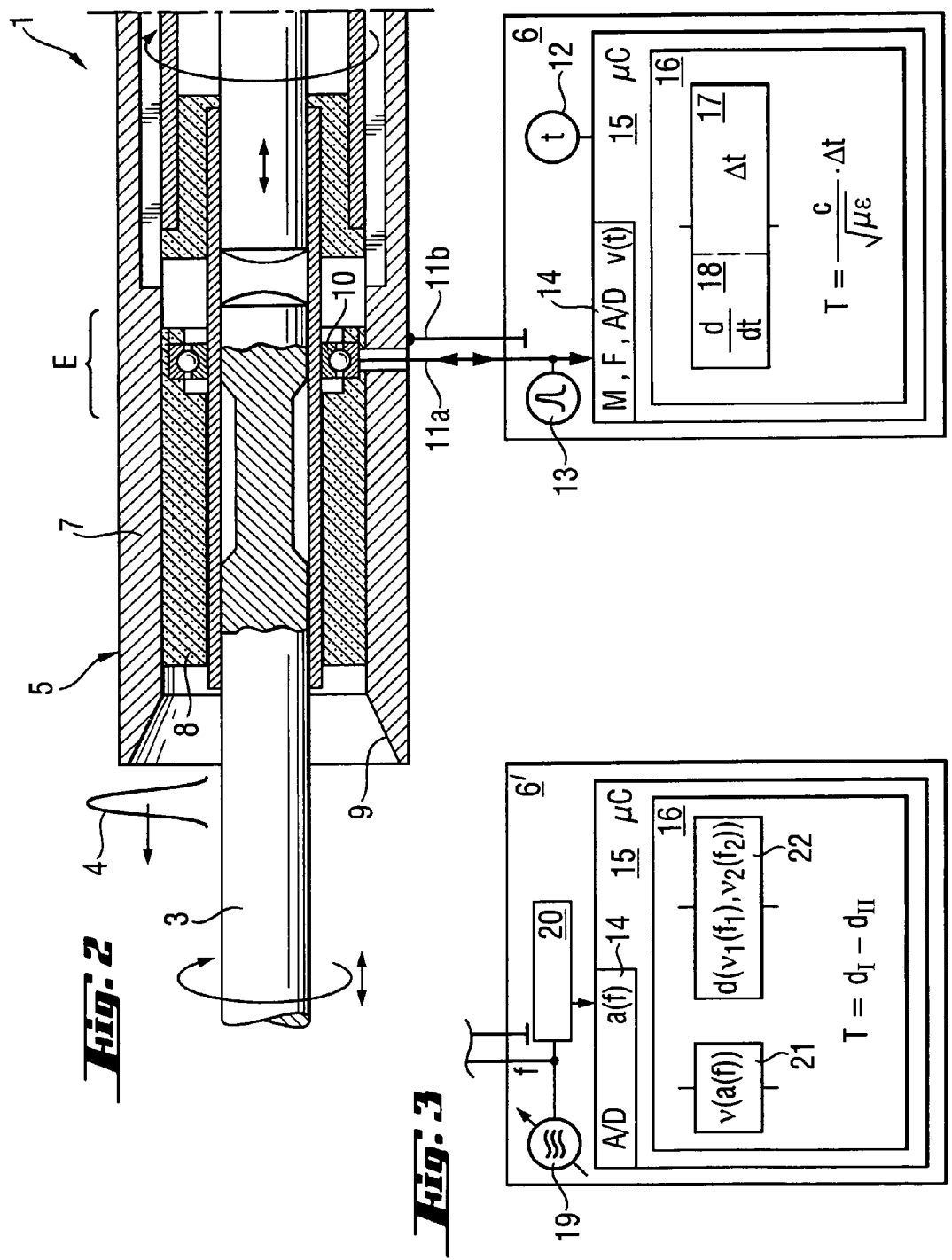

POWER TOOL WITH MEASUREMENT OF A PENETRATION DEPTH OF A WORKING TOOL

BACKGROUND OF THE INVENTION

1. Field of the Invention

The invention relates to a power tool with means for measuring the penetration depth of working tools into the machined material, preferably, with a drill depth measurement device for measuring a penetration depth of a drilling tool for drilling a blind hole, and to the use of the device as a depth stop in hand-held power tools such as drill hammers or core drilling machines, and to an associated measurement method.

2. Description of the Prior Art

The depth to which a working tool penetrates into the machined material is usually measured along an auxiliary measurement path. Accordingly, a hand-held power tool usually has a mechanical, acoustic, or optical depth measurement system with which the distance of a reference point which is fixed with respect to the power tool from the surface of the machined material, can be measured directly, and with which the penetration depth can be determined indirectly by subtraction using the previously known tool length relative to the reference point. In hand-held power tools, when a predetermined penetration depth is reached, deeper penetration of the tool is prevented by a mechanical stop (depth stop) or by interrupting the main drive.

A rod-shaped depth stop which extends along the tool axis at a distance from the latter is most commonly used in hand-held power tools. The depth stop can be fixed so as to be displaceable axially with respect to the reference point which is fixed with respect to the machine and is often provided with a distance measurement scale. Mechanical depth stops of this kind limit the axial rotational degree of freedom and can bend. In addition, the adjustment of the mechanical depth stop requires some skill because it would actually require three hands: one hand for holding the scale, one hand for opening the handle, and one hand for holding the device. The latter can otherwise be accomplished only by setting the hand-held power tool down on the ground or pressing it against a wall with the body.

According to DE2838968, different types of electronic depth stops for hand-held power tools are suggested for distance measurement during runtime, particularly based on measurement methods using ultrasound, electromagnetic waves, or light which is emitted at a distance parallel from the reference point (i.e., having a parallax) to the tool axis and is reflected at the surface of the machined material. An angle of inclination of the tool axis that deviates from the perpendicular of the surface leads to measurement errors in principle.

Also, it is known to use special cable testers for finding defective locations in very long data transfer cables. These special cable testers are based on the measurement principle of time domain reflectometry with high-frequency electromagnetic waves propagating along the cable, e.g., according to U.S. Pat. No. 4,739,276.

SUMMARY OF THE INVENTION

It is an object of the invention to provide a penetration depth measurement system for measuring a penetration depth of working tools without parallax.

This and other objects of the present invention, which will become apparent hereinafter, are achieved by providing a power tool for driving a working tool that penetrates at least axially into a to-be-machined material and having a signal processor and a transducer which is suitable for exciting and detecting a high-frequency electromagnetic wave propagating axially along the working tool and which is connected to the signal processor that is designed to determine the penetration depth of the working tool into the material based on high-frequency electromagnetic waves.

It is possible to measure the penetration depth of working tools without parallax with the transducer and the signal processor based on a high-frequency electromagnetic wave propagating directly along the working tool. It will be attempted in the following to illustrate this with reference to some physical principles.

The working tool which penetrates into a to-be-machined material is itself the waveguide of the electromagnetic wave. With respect to axially homogeneous length areas, the wave is characterized substantially by the propagation velocity and the characteristic impedance which substantially depends on the dielectric surrounding the waveguide. The exposed length of the working tool can be considered as a bare waveguide in a cylindrical tool and as two parallel waveguides in a double-lead drill helix, and the axial length portion of the working tool guided in the power tool can be considered approximately as a coaxial waveguide. Because of the jump in the characteristic impedance to infinity, a total reflection of the wave comes about at the free end of the working tool. Due to the fact that a change in the dielectric (from $\in=1$ for air to $\in=3.5$ for mineral substrates) and accordingly of the characteristic impedance likewise takes place at the surface of the to-be-machined material, the wave is at least partially reflected at that location. The electric field strength of the wave can be detected at the transducer by means of a voltage measurement. Accordingly, based on the voltage signals of the reflections of the free end of the tool and of the surface that are detected by the transducer, the penetration depth can be determined by corresponding signal processing of the working tool.

The transducer is advantageously formed as a coaxial conductor system whose elongate inner conductor is formed at least partially by the high-frequency conducting working tool and whose sleeve-shaped outer conductor is formed at least partially by a high-frequency conducting housing of the power tool. The inner conductor and outer conductor are insulated from one another with respect to high frequency resulting in a coaxial conductor portion with constant characteristic impedance so that the high-frequency electromagnetic waves can propagate within the power tool, without reflection along the working tool.

The outer conductor advantageously forms a radial widening at the front on its working tool-side so that the characteristic impedance is adapted to the characteristic impedance of vacuum at the end on the working tool side so that the high-frequency electromagnetic waves separate without reflection from the power tool and can propagate along the exposed working tool. Adaptation is carried out in an analogous manner for the incoming, reflected waves.

The transducer which is formed as a coaxial line advantageously has a high-frequency conducting, e.g., galvanic or capacitive, feed connection at the inner conductor and at the outer conductor, respectively, in the machine-side axial end area of the tool that is held in the power tool, so that the feed takes place in the region of the voltage maximum.

The feed connection of the inner conductor is advantageously formed so as to be freely rotatable, e.g., by means of a conductive pivot bearing or a high-frequency rotary coupler, enabling a feed to a rotary-driven tool as waveguide.

The signal processor advantageously has a clock generator, a high-frequency pulse generator which is suitable for outputting voltage pulses with rise times of less than 120 ps, a fast measurement input which is suitable for detecting voltage signals with sampling times of less than 12 ps, and computing means which contain a controlling algorithm having a runtime module for determining the time difference between at least two voltage pulses selected by the measurement input so that a distance measurement is carried out by means of a direct runtime measurement of pulse-shaped waves along the tool.

The signal processor or the runtime module advantageously has a (digital or analog) differentiation device suitable for differentiating the voltage signals so that the jumps to be detected over time in the voltage signals are transformed into signal peaks (positive and negative) which can be detected in a simple and reliable manner.

The time difference between the first positive signal peak and the first negative signal peak is advantageously measured in the associated measurement method so that the runtime difference of the wave reflected at the surface (positive signal peak) and of the wave reflected at the end of the tool (negative signal peak), which is proportional to the penetration depth, is measured.

Alternatively, the signal processor advantageously has a variable-frequency high-frequency oscillator which is suitable for stationary oscillations with frequencies greater than 8 GHz, a demodulator for amplitude modulation of the high-frequency signal, a measurement input suitable for detecting the amplitude signal of the high-frequency signal, and computing means containing a controlling algorithm which has a standing wave module for determining the high-frequency-specific standing wave ratio and a distance module for determining a distance based on at least two different high-frequency-specific standing wave ratios so that a distance measurement is realized at different frequencies indirectly by way of a standing wave ratio measurement depending on the phase position of the superimposed applied waves and reflected waves.

In the associated measurement method for determining the penetration depth of a tool penetrating at least axially into a to-be-machined material, the distance to the free end of the exposed tool is advantageously measured in a first step, and the distance to the surface of the machined material with the tool penetrating into the to-be-machined material is advantageously measured in a second step so that, instead of absolute distance measurements, relative distance measurements are sufficient because the penetration depth is given by the difference between the distances.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

BRIEF DESCRIPTION OF THE DRAWINGS

FIG. 1 shows a side view of a power tool with a penetration depth measurement arrangement;

FIG. 2 shows a longitudinal cross-sectional view of detail of the power tool of FIG. 1; and FIG. 3 shows a schematic view of an alternative signal processor.

DETAILED DESCRIPTION OF THE PREFERRED EMBODIMENTS

According to FIG. 1, a power tool 1 for rotary and percussive driving of a working tool 3 in the form of a trepan, which penetrates axially into a to-be-machined material 2, has a transducer 5 (FIG. 2) which is suitable for exciting and detecting a high-frequency, electromagnetic, pulse-shaped wave 4 propagating axially along the tool 3 and which is connected to a signal processor 6 (FIG. 2) which is designed for determining the penetration depth T of the working tool 3 in the material 2 based on high-frequency electromagnetic waves 4.

According to FIG. 2, the transducer 5 is formed as a coaxial conductor system whose elongate inner conductor is formed at least partially by the high-frequency conducting working tool 3, and whose sleeve-shaped outer conductor is formed at least partially by a high-frequency conducting housing 7 of the power tool 1. The inner conductor and the outer conductor are insulated from one another with respect to high frequency by a ceramic insulating material 8. The outer conductor forms a radial widening 9 in the form of a horn-shaped emitter at the front of its working tool side. At the inner conductor which is formed so as to be freely rotatable, the transducer 5 has a galvanically high-frequency conducting first feed connection 11a which is formed as a conductive pivot bearing 10 and, at the outer conductor, the transducer 5 has a high-frequency conducting second feed connection 11b. The first and second feed connections 11a, 11b are arranged in the power tool-side axial end area E of the working tool 3 that is received in the power tool 1 in the form of an electropneumatic drill hammer, shown only partially. The signal processor 6 has a clock generator 12 for the time t, a high-frequency pulse generator 13 suitable for emitting voltage pulses with rise times of 50 ps, a fast measurement input 14 comprising a pulse mixer M (sequential sampling carried out, e.g., by a stroboscopically sampled diode bridge) for detecting voltage signals v(t) with sampling times of 5 ps, a lowpass filter F arranged downstream, and an analog-to-digital converter A/D arranged downstream. The signal processor 6 also has computing means 15 in the form of a microcontroller μC containing a controlling algorithm 16 for determining the penetration depth T. The controlling algorithm 16 has a runtime module 17 for determining the time difference $\Delta t$ between two voltage pulses of the pulse-shaped waves 4 which are selected by the measurement input. The runtime module 17 has digital differentiating means 18 which are suitable for differentiation of the voltage signals v(t) and which, in the associated measurement method, measure the time difference $\Delta t$ between the first positive signal peak and the first negative signal peak, which time difference $\Delta t$ is proportional to the penetration depth T, where c is the velocity of light in vacuum, μ is the permeability, and $\in$ is the permittivity.

According to the alternative embodiment of the signal processor 6' shown in FIG. 3, in contrast to FIG. 2, the signal processor 6' has a variable-frequency high-frequency oscillator 19 which is suitable for stationary oscillations with frequencies f greater than 8 GHz, a demodulator 20 for amplitude modulation of the high-frequency signal f to an amplitude signal a(f), a measurement input 14 in the form of an analog-to-digital converter A/D which is suitable for detecting the amplitude signal a(f) of the high-frequency signal f, and computing means 15 in the form of a microcontroller μC which contains a controlling algorithm 16 for determining the penetration depth T having a standing wave module 21 for determining the high-frequency-specific standing wave ratio v, and a distance module 22 for determining an (absolute) distance d based on at least two different highfrequency-specific standing wave ratios $v_1$, $v_2$ at different frequencies $f_1$, $f_2$. In the associated measurement method, for determining the penetration depth T of the tool 3 (FIG. 1) penetrating axially into the material 2 to be machined (FIG. 1), a distance measurement I to the free end of the tool is carried out in a first step with the tool 3 exposed (FIG. 1), and a distance measurement II to the surface of the machined material 2 (FIG. 1) is carried out with the tool 3 penetrating into the material 2 to be machined (FIG. 2) in a second step. The penetration depth T is determined by the difference of the two distances $d_I$, $d_{II}$.

Though the present invention was shown and described with references to the preferred embodiments, such are merely illustrative of the present invention and are not to be construed as a limitation thereof and various modifications of the present invention will be apparent to those skilled in the art. It is, therefore, not intended that the present invention be limited to the disclosed embodiments or details thereof, and the present invention includes all variations and/or alternative embodiments within the spirit and scope of the present invention as defined by the appended claims.

What is claimed is:

1. A power tool for driving a working tool (3) that penetrates at least axially into a to-be-machined material (2), comprising a signal processor (6, 6') designed to determine a penetration depth (T) of the working tool (3) into the material (2) based on high frequency electromagnetic waves (4); and a transducer (5) suitable for exciting and detecting a high-frequency electromagnetic wave (4) propagating axially along the working tool (3), which is a waveguide of the electromagnetic wave, and connected to the signal processor (6, 6');
   wherein the transducer (5) is formed as a coaxial conductor system whose elongate inner conductor is formed at least partially by the high-frequency conducting power tool (3) and whose sleeve-shaped outer conductor is formed at least partially by a high-frequency conducting housing (7) of the power tool, the inner conductor and outer conductor being insulated from one another with respect to high frequency.

2. A power tool according to claim 1, wherein the transducer (5) has a high-frequency conducting feed connection (11a, 11b) at the inner conductor and at the outer conductor, respectively, in a power tool-side axial end area of the working tool (3).

3. A power tool according to claim 1, wherein the outer conductor forms a radial widening (9) at a front on a working tool side thereof.

4. A power tool according to claim 2, wherein the feed connection (11a) is freely rotatable.

5. A power tool for driving a working tool (3) that penetrates at least axially into a to-be-machined material (2), comprising a signal processor (6, 6') designed to determine a penetration depth (T) of the working tool (3) into the material (2) based on high frequency electromagnetic waves (4); and a transducer (5) suitable for exciting and detecting a high-frequency electromagnetic wave (4) propagating axially along the working tool (3), which is a waveguide of the electromagnetic wave, and connected to the signal processor (6, 6');
   wherein the signal processor (6) has a clock generator (12), a high-frequency pulse generator (13) which is suitable for outputting voltage pulses with rise times of less than 120 ps, a fast measurement input (14) which is suitable for detecting voltage signals with sampling times of less than 12 ps, and computing means (15) which contain a controlling algorithm (16) having a runtime module (17) for determining a time difference ($\Delta t$) between at least two voltage pulses selected by the measurement input (14).

6. A power tool according to claim 5, comprising a differentiation device (18) suitable for differentiating signal peaks of voltage signals.

7. A power tool for driving a working tool (3) that penetrates at least axially into a to-be-machined material (2), comprising a signal processor (6, 6') designed to determine a penetration depth (T) of the working tool (3) into the material (2) based on high frequency electromagnetic waves (4); and a transducer (5) suitable for exciting and detecting a high-frequency electromagnetic wave (4) propagating axially along the working tool (3), which is a waveguide of the electromagnetic wave, and connected to the signal processor (6, 6');
   wherein the signal processor (6') has a variable-frequency high-frequency oscillator (19) which is suitable for stationary oscillations with frequencies greater than 8 GHz, a demodulator (20) for amplitude modulation of the high-frequency signal, a measurement input (14) suitable for detecting the amplitude signal of the high-frequency signal, and computing means (15) containing a controlling algorithm (16) which has a standing wave module (21) for determining the high-frequency-specific standing wave ratio and a distance module (22) for determining a distance (d) based on at least two different high-frequency-specific standing wave ratios.

8. A measurement method of determining the penetration depth (T) of a working tool (3) penetrating at least axially into a to-be-machined material, comprising the steps of providing a power tool for driving a working tool (3) that penetrates at least axially into a to-be-machined material (2), comprising a signal processor (6, 6') designed to determine a penetration depth (T) of the working tool (3) into the material (2) based on high frequency electromagnetic waves (4); and a transducer (5) suitable for exciting and detecting a high-frequency electromagnetic wave (4) propagating axially along the working tool (3), which is a waveguide of the electromagnetic wave, and connected to a signal processor (6, 6'), carrying out a distance measurement up to a free end of the working tool in a first step, with the working tool (3) being exposed, and carrying out a distance measurement up to a surface of the machined material (2) in a second step with the working tool (3) penetrating into the machined material (2);
   wherein a time difference ($\Delta t$) between a first positive signal peak and a first negative signal peak is measured.

9. A power tool for driving a working tool (3) that penetrates at least axially into a to-be-machined material (2), comprising a signal processor (6, 6') designed to determine a penetration depth (T) of the working tool (3) into the material (2) based on high frequency electromagnetic waves (4); and a transducer (5) suitable for exciting and detecting a high-frequency electromagnetic wave (4) propagating axially along the working tool (3) and connected to the signal processor (6, 6');
   wherein the transducer (5) is formed as a coaxial conductor system whose elongate inner conductor is formed at least partially by the high-frequency conducting power tool (3) and whose sleeve-shaped outer conductor is formed at least partially by a high-frequency conducting housing (7) of the power tool, the inner conductor and outer conductor being insulated from one another with respect to high frequency.

10. A power tool according to claim 9, wherein the transducer (5) has a high-frequency conducting feed connection (11a, 11b) at the inner conductor and at the outer conductor, respectively, in a power tool-side axial end area of the working tool (3).

11. A power tool according to claim 10, wherein the feed connection (11a) is freely rotatable.

12. A power tool according to claim 9, wherein the outer conductor forms a radial widening (9) at a front on a working tool side thereof.

13. A power tool for driving a working tool (3) that penetrates at least axially into a to-be-machined material (2), comprising a signal processor (6, 6') designed to determine a penetration depth (T) of the working tool (3) into the material (2) based on high frequency electromagnetic waves (4); and a transducer (5) suitable for exciting and detecting a high-frequency electromagnetic wave (4) propagating axially along the working tool (3) and connected to the signal processor (6, 6');

wherein the signal processor (6) has a clock generator (12), a high-frequency pulse generator (13) which is suitable for outputting voltage pulses with rise times of less than 120 ps, a fast measurement input (14) which is suitable for detecting voltage signals with sampling times of less than 12 ps, and computing means (15) which contain a controlling algorithm (16) having a runtime module (17) for determining a time difference ($\Delta t$) between at least two voltage pulses selected by the measurement input (14).

14. A power tool according to claim 13, comprising a differentiation device (18) suitable for differentiating signal peaks of voltage signals.

15. A power tool for driving a working tool (3) that penetrates at least axially into a to-be-machined material (2), comprising a signal processor (6, 6') designed to determine a penetration depth (T) of the working tool (3) into the material (2) based on high frequency electromagnetic waves (4); and a transducer (5) suitable for exciting and detecting a high-frequency electromagnetic wave (4) propagating axially along the working tool (3) and connected to the signal processor (6, 6');

wherein the signal processor (6') has a variable-frequency high-frequency oscillator (19) which is suitable for stationary oscillations with frequencies greater than 8 GHz, a demodulator (20) for amplitude modulation of the high-frequency signal, a measurement input (14) suitable for detecting the amplitude signal of the high-frequency signal, and computing means (15) containing a controlling algorithm (16) which has a standing wave module (21) for determining the high-frequency-specific standing wave ratio and a distance module (22) for determining a distance (d) based on at least two different high-frequency-specific standing wave ratios.

16. A measurement method of determining the penetration depth (T) of a working tool (3) penetrating at least axially into a to-be-machined material, comprising the steps of providing a power tool for driving a working tool (3) that penetrates at least axially into a to-be-machined material (2), comprising a signal processor (6, 6') designed to determine a penetration depth (T) of the working tool (3) into the material (2) based on high frequency electromagnetic waves (4); and a transducer (5) suitable for exciting and detecting a high-frequency electromagnetic wave (4) propagating axially along the working tool (3) and connected to a signal processor (6, 6'), carrying out a distance measurement up to a free end of the working tool in a first step, with the working tool (3) being exposed, and carrying out a distance measurement up to a surface of the machined material (2) in a second step with the working tool (3) penetrating into the machined material (2);

wherein the time difference ($\Delta t$) between a first positive signal peak and a first negative signal peak is measured.

* * * * *